US011317435B2

United States Patent
Suzuki et al.

(10) Patent No.: US 11,317,435 B2
(45) Date of Patent: Apr. 26, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Shoichi Suzuki, Sakai (JP); Tomoki Yoshimura, Sakai (JP); Toshizo Nogami, Sakai (JP); Wataru Ouchi, Sakai (JP); Taewoo Lee, Sakai (JP); Huifa Lin, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 17/415,023

(22) PCT Filed: Dec. 25, 2019

(86) PCT No.: PCT/JP2019/050819
§ 371 (c)(1),
(2) Date: Jun. 17, 2021

(87) PCT Pub. No.: WO2020/138165
PCT Pub. Date: Jul. 2, 2020

(65) Prior Publication Data
US 2021/0360687 A1 Nov. 18, 2021

(30) Foreign Application Priority Data

Dec. 27, 2018 (JP) .............................. JP2018-245250

(51) Int. Cl.
*H04W 72/14* (2009.01)
*H04W 72/04* (2009.01)
*H04W 72/12* (2009.01)

(52) U.S. Cl.
CPC ......... *H04W 72/14* (2013.01); *H04W 72/044* (2013.01); *H04W 72/1268* (2013.01)

(58) Field of Classification Search
CPC .......................... H04W 72/14; H04W 72/044; H04W 72/1268
See application file for complete search history.

(56) References Cited

U.S. PATENT DOCUMENTS

2020/0205090 A1* 6/2020 Loehr ............... H04W 72/0413
2020/0344032 A1* 10/2020 Yang ................. H04W 72/0453
2021/0218519 A1* 7/2021 Gou .................. H04W 72/0446

OTHER PUBLICATIONS

"3rd Generation Partnership Project; Technical Specification Group Radio Access Network; NR; Physical channels and modulation (Release 15)", 3GPP TS 38.211 V15.3.0, Sep. 2018, pp. 1-96.

(Continued)

*Primary Examiner* — Kevin M Cunningham
(74) *Attorney, Agent, or Firm* — Keating & Bennett, LLP

(57) ABSTRACT

A terminal apparatus includes a transmitter configured to transmit, in one uplink BWP of one serving cell, a first PUSCH corresponding to a configured uplink grant, and a receiver configured to receive, in one downlink BWP of the one serving cell, downlink control information to be used to schedule a second PUSCH on a PDCCH, in which, in a case that a duration of the first PUSCH overlaps a duration of the second PUSCH in the one uplink BWP, a first uplink symbol of the first PUSCH is expected to not be earlier than a first (next) uplink symbol at which a CP begins after a predetermined period of time after a last symbol of the PDCCH.

8 Claims, 12 Drawing Sheets

(56) References Cited

OTHER PUBLICATIONS

"3rd Generation Partnership Project; Technical Specification Group Radio Access Network; NR; Multiplexing and channel coding (Release 15)", 3GPP TS 38.212 V15.3.0, Sep. 2018, pp. 1-99.

"3rd Generation Partnership Project; Technical Specification Group Radio Access Network; NR; Physical layer procedures for control (Release 15)", 3GPP TS 38.213 V15.3.0, Sep. 2018, pp. 1-101.

"3rd Generation Partnership Project; Technical Specification Group Radio Access Network; NR; Physical layer procedures for data (Release 15)", 3GPP TS 38.214 V15.3.0, Sep. 2018, pp. 1-96.

"3rd Generation Partnership Project; Technical Specification Group Radio Access Network; NR; NR and NG-RAN Overall Description; Stage 2 (Release 15)", 3GPP TS 38.300 V15.3.1, Oct. 2018, pp. 1-92.

"3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.

Ericsson, "Intra-UE Prioritization and Multiplexing of UL Transmissions", TSG-RAN WG1 Meetiny#95, R1-1812157, Nov. 12-16, 2018, 3 pages.

Ericsson, "On prioritization between overlapping configured and dynamic grants", 3GPP TSG-RAN WG2 #104, R2-1817178, Nov. 12-16, 2018, 3 pages.

* cited by examiner

Figure A: Number of OFDM symbols per slot, slots per frame, and slots per subframe for normal cyclic prefix.

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

The terminal device 1 shall:

> 706a> instruct the physical layer to receive, in the PDSCH duration of the configured downlink assignment, the transport block on the DL-SCH according to the configured downlink assignment and to deliver the transport block to the HARQ entity;
>
> 706b> set the HARQ Process ID to the HARQ Process ID associated with this PDSCH duration;
>
> 706c> consider the NDI bit to have been toggled; and
>
> 706d> indicate the presence of a configured downlink assignment and deliver the stored HARQ information to the HARQ entity.

The terminal device 1 (HARQ entity) shall:

> 706e> allocate the TB(s) received from the physical layer and the associated HARQ information to the HARQ process indicated by the associated HARQ information.

The terminal device 1 (HARQ process) shall:

> 706f> attempt to decode the received TB(s); and
>
> 706g> instruct the physical layer to generate acknowledgement(s) of the data in this TB.

The terminal device 1 shall:

1006a> set the HARQ Process ID to the HARQ Process ID associated with this PUSCH duration;

1006b> consider the NDI bit for the corresponding HARQ process to have been toggled; and 1006c> deliver the configured uplink grant and the associated HARQ information to the HARQ entity..

The terminal device 1 (HARQ entity) shall:

1006d> obtain the MAC PDU to transmit from the Multiplexing and assembly entity, if any;.

1006e> deliver the MAC PDU and the uplink grant and the HARQ information of the TB to the identified HARQ process; and 1006f> instruct the identified HARQ process to trigger a new transmission;:

The terminal device 1 (HARQ process) shall:

1006g> store the MAC PDU in the associated HARQ buffer;

1006h> store the uplink grant received from the HARQ entity;

1006i> instruct the physical layer to generate a transmission according to the stored uplink grant.

FIG. 11

TERMINAL APPARATUS, BASE STATION APPARATUS, AND COMMUNICATION METHOD

TECHNICAL FIELD

The present invention relates to a terminal apparatus, a base station apparatus, and a communication method. This application claims priority based on JP 2018-245250 filed on Dec. 27, 2018, the contents of which are incorporated herein by reference.

BACKGROUND ART

A radio access method and a radio network for cellular mobile communications (hereinafter referred to as "Long Term Evolution (LTE: a registered trademark)", or "Evolved Universal Terrestrial Radio Access (EUTRA)") are being studied in the 3rd Generation Partnership Project (3GPP) (Non Patent Literature 1, 2, 3, 4, and 5). In addition, a new radio access method (hereinafter referred to as "New Radio (NR)") is being studied in 3GPP. In LTE, a base station apparatus is also referred to as an evolved NodeB (eNodeB). In NR, a base station apparatus is also referred to as a gNodeB. In LTE and NR, a terminal apparatus is also referred to as User Equipment (UE). LTE and NR are cellular communication systems in which multiple areas covered by a base station apparatus are deployed in a form of cells. A single base station apparatus may manage multiple cells.

A PDCCH, a PUSCH, and a PDSCH are used in downlink of NR (Non Patent Literature 1, 2, 3, and 4). A PDCCH is used to transmit Downlink Control Information (DCI). A DCI format 0_0 is used for scheduling of a PUSCH, and a DCI format 1_0 is used for scheduling of a PDSCH (Non Patent Literature 2).

Dynamic scheduling and Semi-Persistent Scheduling (SPS) are supported in downlink of NR. In uplink of NR, dynamic scheduling and a configured grant are supported (Non Patent Literature 6 and 7).

CITATION LIST

Non Patent Literature

NPL 1: "3GPP TS 38.211 V15.3.0 (2018-09), NR; Physical Channels and Modulation", Sep. 29, 2018.

NPL 2: "3GPP TS 38.212 V15.3.0 (2018-09), NR; Multiplexing and Channel Coding", Sep. 29, 2018.

NPL 3: "3GPP TS 38.213 V15.3.0 (2018-09), NR; Physical Layer Procedures for Control", Oct. 1, 2018.

NPL 4: "3GPP TS 38.214 V15.3.0 (2018-09), NR; Physical Layer Procedures for Data" Oct. 1, 2018.

NPL 5: "3GPP TS 38.214 V15.3.0 (2018-09), NR; Physical Layer Procedures for Data", Oct. 1, 2018.

NPL 6: "3GPP TS 38.300 V15.3.1 (2018-09), NR; Overall Description; Stage-2", Oct. 7, 2018.

NPL 7: "3GPP TS 38.321 V15.3.1 (2018-09), NR; Medium Access Control (MAC) Protocol Specification", Sep. 25, 2018.

SUMMARY OF INVENTION

Technical Problem

The present invention provides a terminal apparatus, a communication method used by the terminal apparatus, a base station apparatus, and a communication method used by the base station apparatus. A terminal apparatus, a communication method used by the terminal apparatus, a base station apparatus, and a communication method used by the base station apparatus according to an aspect of the present invention include a method for transmission/reception of a PDSCH and/or transmission/reception of a PUSCH.

Solution to Problem (1) According to some aspects of the present invention, the following measures are provided. That is, a first aspect of the present invention is a terminal apparatus including a transmitter configured to transmit, in one uplink BWP of one serving cell, a first PUSCH corresponding to a configured uplink grant, and a receiver configured to receive, in one downlink BWP of the one serving cell, downlink control information to be used to schedule a second PUSCH on a PDCCH, in which, in the one uplink BWP, in a case that a duration of the first PUSCH overlaps a duration of the second PUSCH, a first uplink symbol of the first PUSCH is expected to not be earlier than a first (next) uplink symbol at which a CP begins after a predetermined period of time after a last symbol of the PDCCH.

(2) A second aspect of the present invention is a base station apparatus including a receiver configured to receive, in one uplink BWP of one serving cell, a first PUSCH corresponding to a configured uplink grant, and a transmitter configured to transmit, in one downlink BWP of the one serving cell, downlink control information to be used to schedule a second PUSCH on a PDCCH, in which, in the one uplink BWP, in a case that a duration of the first PUSCH overlaps a duration of the second PUSCH, a first uplink symbol of the first PUSCH is expected to not be earlier than a first (next) uplink symbol at which a CP begins after a predetermined period of time after a last symbol of the PDCCH.

(3) A third aspect of the present invention is a communication method used by a terminal apparatus, the communication method including transmitting, in one uplink BWP of one serving cell, a first PUSCH corresponding to a configured uplink grant, and receiving, in one downlink BWP of the one serving cell, downlink control information to be used to schedule a second PUSCH on a PDCCH, in which, in the one uplink BWP, in a case that a duration of the first PUSCH overlaps a duration of the second PUSCH, a first uplink symbol of the first PUSCH is expected to not be earlier than a first (next) uplink symbol at which a CP begins after a predetermined period of time after a last symbol of the PDCCH.

(4) A fourth aspect of the present invention is a communication method used by a base station apparatus, the communication method including receiving, in one uplink BWP of one serving cell, a first PUSCH corresponding to a configured uplink grant, and transmitting, in one downlink BWP of the one serving cell, downlink control information to be used to schedule a second PUSCH on a PDCCH, in which, in the one uplink BWP, in a case that a duration of the first PUSCH overlaps a duration of the second PUSCH, a first uplink symbol of the first PUSCH is expected to not be earlier than a first (next) uplink symbol at which a CP begins after a predetermined period of time after a last symbol of the PDCCH.

Advantageous Effects of Invention

According to one aspect of the present invention, a terminal apparatus and a base station apparatus can efficiently perform communication.

BRIEF DESCRIPTION OF DRAWINGS

FIG. 3 is an example illustrating a relationship between $N^{slot}_{symb}$, a subcarrier spacing configuration μ, and a CP configuration according to an aspect of the present embodiment.

FIG. 8 is a diagram illustrating a detailed example of step 706 according to the present embodiment.

FIG. 11 is a diagram illustrating a detailed example of step 1006 of the present embodiment.

DESCRIPTION OF EMBODIMENTS

An embodiment of the present invention will be described below.

Figure 1:
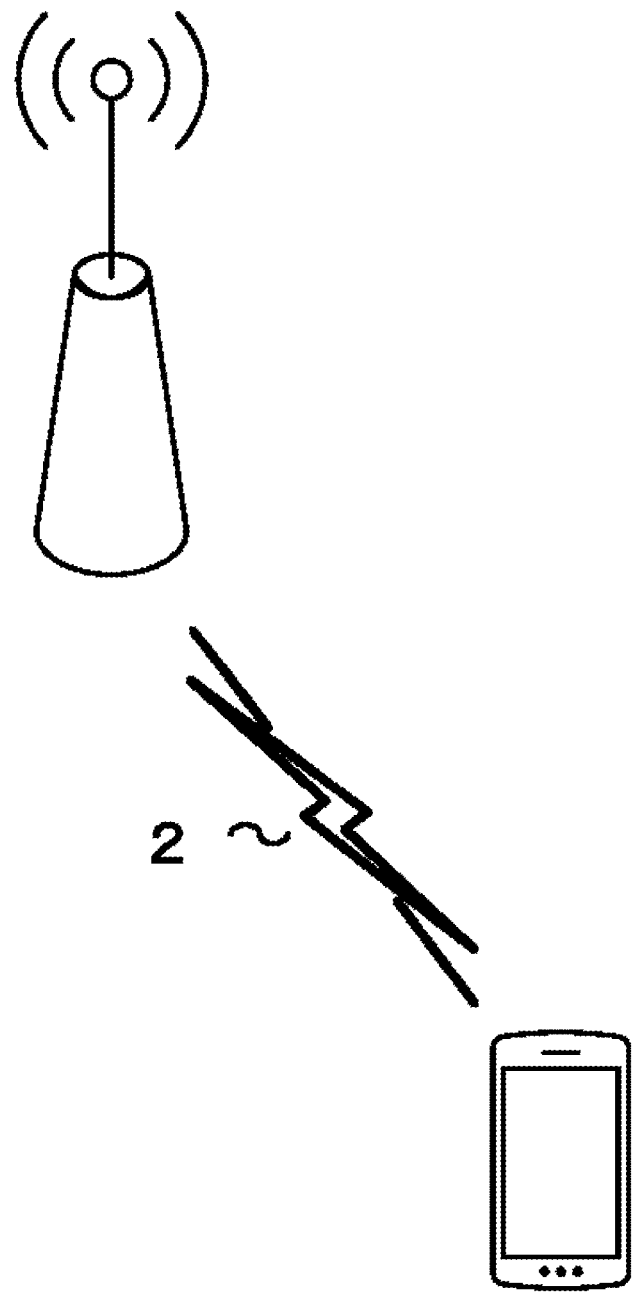
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1 and a base station apparatus 3.

Hereinafter, carrier aggregation will be described.

According to the present embodiment, one or multiple serving cells are configured for the terminal apparatus 1. A technology that allows the terminal apparatus 1 to perform communication via multiple serving cells is referred to as cell aggregation, carrier aggregation, or Dual Connectivity (DC). The present invention may be applied to each of the multiple serving cells configured for the terminal apparatus 1. Furthermore, the present invention may be applied to some of the configured multiple serving cells. The multiple serving cells include at least one primary cell. The multiple serving cells may include one or multiple secondary cells. The present embodiment is applied to one serving cell, unless otherwise specified.

A primary cell is a serving cell in which an initial connection establishment procedure has been performed, a serving cell in which a connection re-establishment procedure has been initiated, or a cell indicated as a primary cell in a handover procedure. A secondary cell may be configured at a point in time when or after a Radio Resource Control (RRC) connection is established.

A carrier corresponding to a serving cell in downlink is referred to as a downlink component carrier. A carrier corresponding to a serving cell in uplink is referred to as an uplink component carrier. A downlink component carrier and an uplink component carrier are collectively referred to as component carriers.

The terminal apparatus 1 can perform simultaneous transmission/reception on multiple physical channels in multiple serving cells (component carriers). A single physical channel is transmitted in a single serving cell (component carrier) among multiple serving cells (component carriers).

Physical channels and physical signals according to the present embodiment will be described.

In uplink radio communication from the terminal apparatus 1 to the base station apparatus 3, the following uplink physical channels are used. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is used to transmit Channel State Information (CSI) of downlink and/or a Hybrid Automatic Repeat reQuest (HARQ-ACK). The CSI and HARQ-ACK are uplink control information (UCI). A HARQ-ACK is also referred to as an acknowledgement (ACK), a HARQ-ACK message, or a HARQ response.

The PUSCH is used to transmit uplink data (Transport block, Uplink-Shared Channel (UL-SCH)), the CSI of downlink, and/or the HARQ-ACK. The CSI and HARQ-ACK are uplink control information (UCI).

The PRACH is used to transmit a random access preamble.

The following uplink physical signal is used in uplink radio communication. Although the uplink physical signal is not used to transmit information output from a higher layer, it is used in the physical layer.

Demodulation Reference Signal (DMRS)

The DMRS is associated with transmission of the PUCCH or the PUSCH. The DMRS may be time-multiplexed with the PUSCH. The base station apparatus 3 may use the DMRS in order to perform channel compensation of the PUSCH.

The following downlink physical channels are used for downlink radio communication from the base station apparatus 3 to the terminal apparatus 1. The downlink physical channels are used to transmit information output from the higher layer.

Physical Downlink Control Channel (PDCCH)
Physical Downlink Control Channel (PDSCH)

The PDCCH is used to transmit Downlink Control Information (DCI). The downlink control information is also referred to as a DCI format. The downlink control information may be used to schedule the PDSCH. The downlink control information may include a downlink assignment used to schedule the PDSCH. The downlink control information may be used to schedule the PUSCH. The downlink control information may include an uplink grant used to schedule the PUSCH.

The downlink control information may be used for activation or deactivation of Semi-Persistent Scheduling (SPS). The downlink control information may be used for activation or deactivation of a configured grant type 2.

The PDSCH is used to transmit downlink data (Transport block, Downlink-Shared Channel (DL-SCH)).

The UL-SCH and the DL-SCH are transport channels. A channel used in a Medium Access Control (MAC) layer is referred to as a transport channel. The unit of transport channels used in the MAC layer is also referred to as a transport block (TB) or a MAC Protocol Data Unit (PDU).

A configuration of a radio frame according to the present embodiment will be described below.

In the radio communication system according to an aspect of the present embodiment, at least Orthogonal Frequency Division Multiplexing (OFDM) is used. An OFDM symbol is the unit of OFDM in the time domain. Each OFDM symbol includes at least one or multiple subcarriers. An OFDM symbol is converted into a time-continuous signal in generation of a baseband signal. At least Cyclic Prefix-Orthogonal Frequency Division Multiplexing (CP-OFDM) is used in downlink. Either CP-OFDM or Discrete Fourier Transform-spread-Orthogonal Frequency Division Multiplexing (DFT-s-OFDM) is used in uplink. DFT-s-OFDM may be provided by applying Transform precoding to CP-OFDM. In the present embodiment, an OFDM symbol is also referred to simply as a symbol.

An OFDM symbol may be a name including a Cyclic Prefix (CP) added to the OFDM symbol. In other words, a certain OFDM symbol may be configured to include the OFDM symbol and a CP added to the OFDM symbol.

SubCarrier spacing (SCS) $\Delta f$ may be $2^\mu *15$ kHz. For example, a subcarrier spacing configuration $\mu$ may be configured as any of 0, 1, 2, 3, 4, and/or 5. The subcarrier spacing configuration $\mu$ may be provided based on a higher layer parameter. The subcarrier spacing configuration may be configured individually in uplink and downlink. The subcarrier spacing configuration $\mu$ may be configured individually for each BWP. A BWP in which the PDCCH is transmitted/received may be the same as or different from a BWP in which the PDSCH corresponding to the PDCCH is transmitted/received. In other words, the subcarrier spacing configuration $\mu$ corresponding to the PDCCH, the subcarrier spacing configuration $\mu$ corresponding to the PDSCH, and the subcarrier spacing configuration $\mu$ corresponding to the PUSCH may be defined individually.

In the radio communication system according to an aspect of the present embodiment, a time unit $T_c$ is used to represent a length of the time domain. The time unit $T_c$ is provided as $T_c=1/(\Delta f_{max}*N_f)$. $\Delta f_{max}$ may be a maximum value of subcarrier spacing supported by the radio communication system according to an aspect of the present embodiment. $\Delta f_{max}$ may be $\Delta f_{max}=480$ kHz. $N_f$ may be $N_f=4096$. A constant $\kappa$ is $\kappa=\Delta f_{max}*N_f/(\Delta f_{ref}N_{f,ref})=64$. $\Delta f_{ref}$ may be 15 kHz. $N_{f,ref}$ may be 2048.

The constant $\kappa$ may be a value indicating a relationship between reference subcarrier spacing and $T_c$. The constant $\kappa$ may be used for a length of a subframe. The number of slots included in a subframe may be provided at least based on the constant $\kappa$. $\Delta f_{ref}$ is a reference subcarrier spacing, and $N_{f,ref}$ is a value corresponding to the reference subcarrier spacing.

Figure 2:
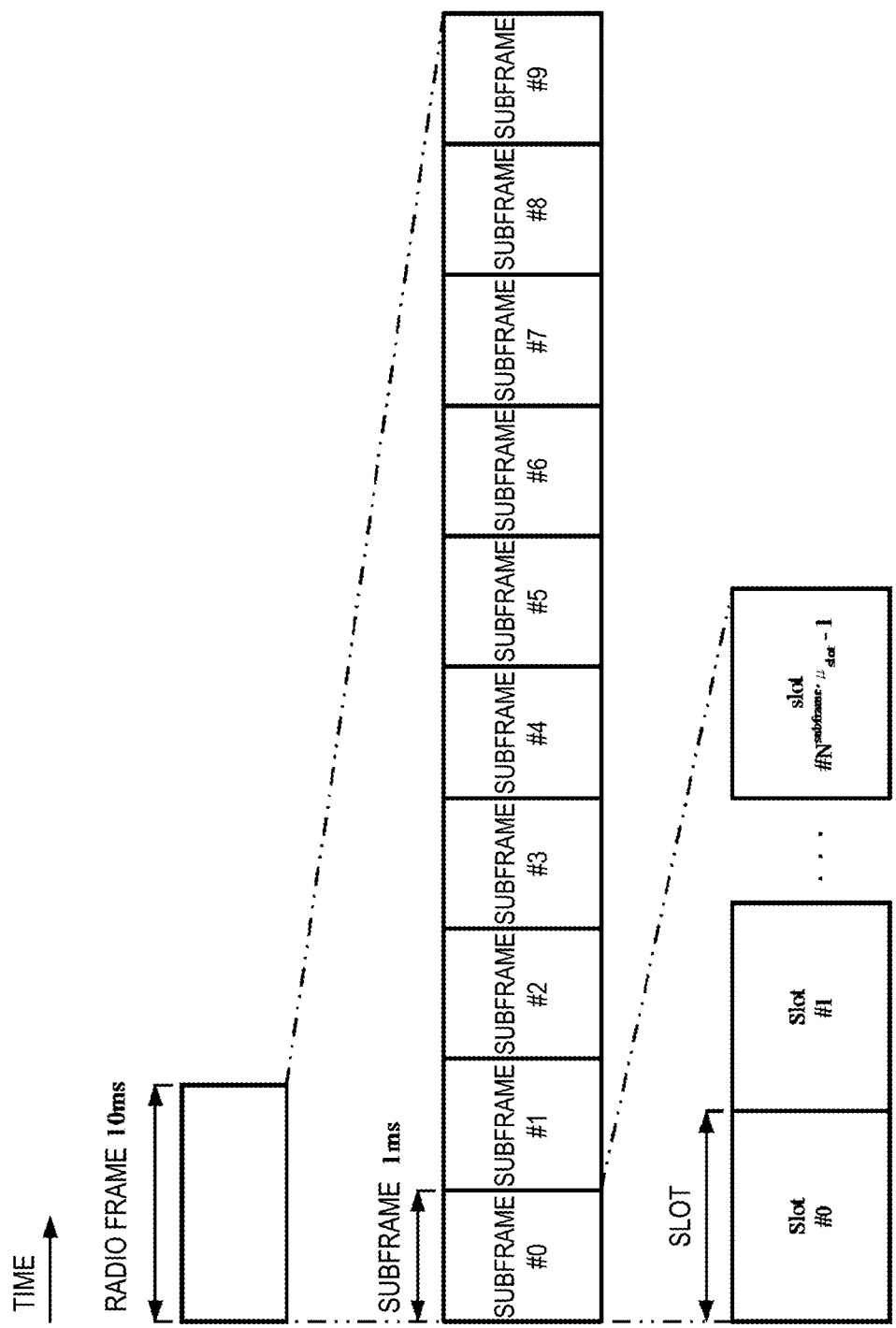
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis represents a time axis. Signal transmission in downlink and/or signal transmission in uplink are performed with radio frames having a length of 10 ms. A radio frame includes 10 subframes. The length of a subframe is 1 ms. The length of a radio frame may be provided independently of subcarrier spacing $\Delta f$. That is, a radio frame may be configured independently of $\mu$. The length of a subframe may be provided independently of subcarrier spacing $\Delta f$. That is, a subframe may be configured independently of $\mu$.

For a certain subcarrier spacing configuration $\mu$, the number of slots included in a subframe and indices of the slots may be provided. For example, slot numbers $n^\mu_s$ in a subframe may be provided in ascending order ranging from 0 to $N^{subframe,\mu}_{slot}-1$ in the subframe. For the subcarrier spacing configuration $\mu$, the number of slots included in a radio frame and indices of the slots may be provided. In addition, slot numbers $n^\mu_{s,f}$ may be provided in ascending order ranging from 0 to $N^{frame,\mu}_{slot}-1$ in a radio frame. $N^{frame,\mu}_{slot}$ is the number of consecutive slots for each radio frame. That is, $N^{frame,\mu}_{slot}$ consecutive slots may be included in one radio frame. $N^{slot}_{symb}$ is the number of consecutive OFDM symbols in each slot. In other words, $N^{slot}_{symb}$ consecutive OFDM symbols may be included in one slot. $N^{slot}_{symb}$ may be provided at least based on a Cyclic Prefix (CP) configuration. The CP configuration may be provided at least based on a higher layer parameter. The CP configuration may be provided at least based on dedicated RRC signaling. A slot number is also referred to as a slot index.

FIG. 3 is an example illustrating a relationship between $N^{slot}_{symb}$, a subcarrier spacing configuration $\mu$, and a CP configuration according to an aspect of the present embodiment. In A in FIG. 3, for example, in a case that the subcarrier spacing configuration $\mu$ is 2 and the CP configuration is a normal cyclic prefix (normal CP), $N^{slot}_{symb}$ is equal to 14, $N^{frame,\mu}_{slot}$ is equal to 40, and $N^{subframe,\mu}_{slot}$ is equal to 4. In addition, in B in FIG. 3, for example, in a case that the subcarrier spacing configuration $\mu$ is 2 and the CP configuration is an extended cyclic prefix (extended CP), $N^{slot}_{symb}$ is equal to 12, $N^{frame,\mu}_{slot}$ is equal to 40, and $N^{subframe,\mu}_{slot}$ is equal to 4.

Figure 4:
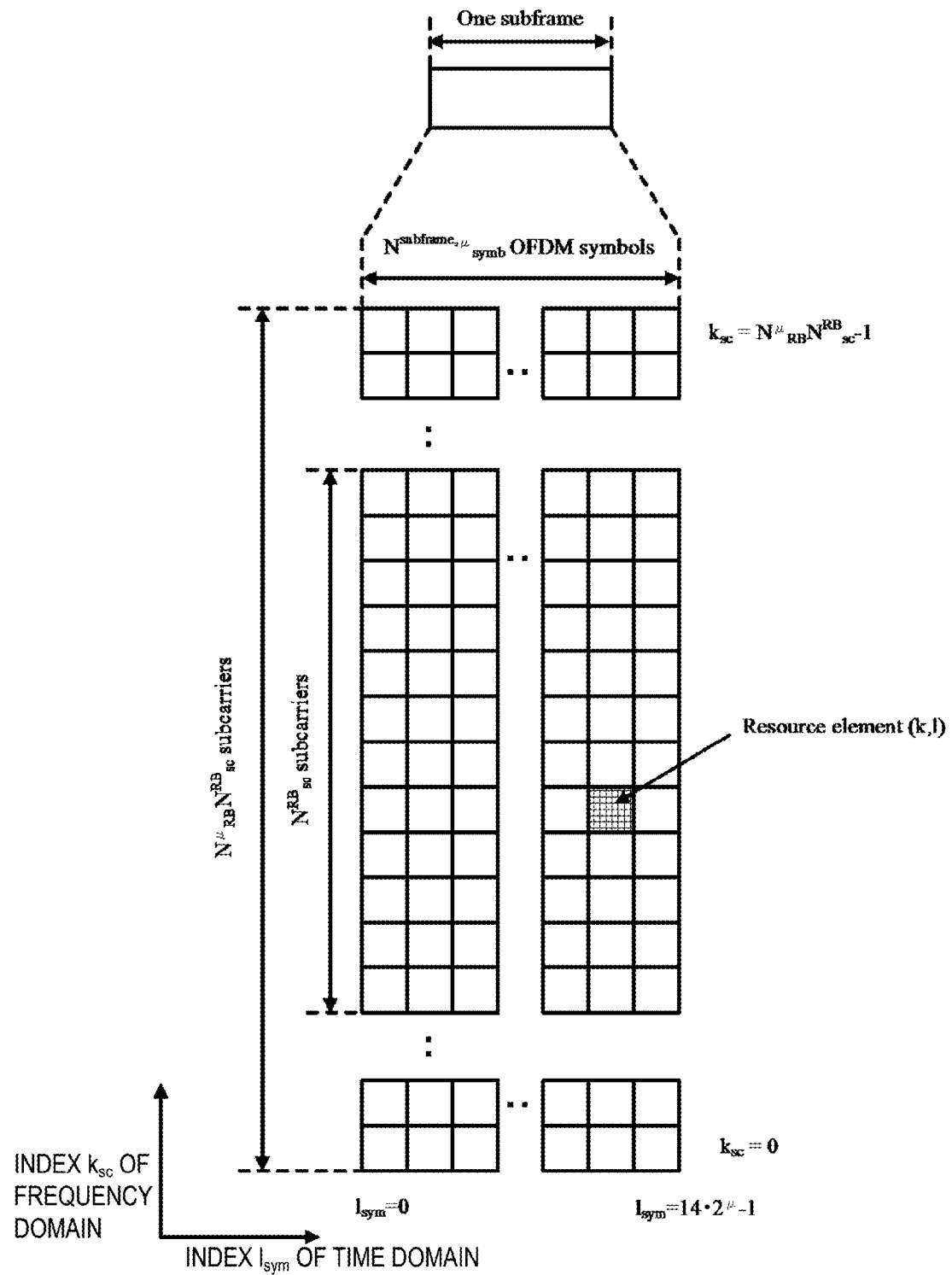
FIG. 4 is a schematic diagram illustrating an example of a resource grid in a subframe according to an aspect of the present embodiment.

FIG. 4 is a schematic diagram illustrating an example of a resource grid in a subframe according to an aspect of the present embodiment. In the resource grid in FIG. 4, the horizontal axis represents an index $l_{sym}$ of the time domain, and the vertical axis represents an index $k_{sc}$ of the frequency domain. In one subframe, the frequency domain of the resource grid includes $N^\mu_{RB}N^{RB}_{sc}$ subcarriers. In one subframe, the number of OFDM symbols constituting a resource grid $N^{subframe,\mu}_{symb}$ may be 14*2$\mu$. One resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive an indication to perform transmission/reception using only a subset of the resource grid. The subset of the resource grid is also referred to as a BWP, and the BWP may be provided at least based on a higher layer parameter and/or some or all DCI. A BWP may also be referred to as a Carrier Bandwidth Part. The terminal apparatus 1 need not receive an indication to perform transmission/reception by using all sets of resource grids. The terminal apparatus 1 may receive an indication to perform transmission/reception by using some frequency resources within the resource grid. One BWP may include multiple resource blocks in the frequency domain. One BWP may include multiple consecutive resource blocks in the frequency domain. A BWP configured for a downlink carrier is also referred to as a downlink BWP. A BWP configured for an uplink carrier is also referred to as an uplink BWP. A BWP may be a subset of the band of a carrier.

One or multiple downlink BWPs may be configured for each serving cell. One or multiple uplink BWPs may be configured for each serving cell.

One downlink BWP among one or multiple downlink BWPs configured for a serving cell may be configured as an active downlink BWP. A downlink BWP switch is used to deactivate one active downlink BWP and to activate an inactive downlink BWP other than the one active downlink BWP. The downlink BWP switch may be controlled by a BWP field included in downlink control information. The downlink BWP switch may be controlled based on a higher layer parameter.

A DL-SCH may be received in the active downlink BWP. A PDCCH may be monitored in the active downlink BWP. A PDSCH may be received in the active downlink BWP.

A DL-SCH may not be received in the inactive downlink BWP. A PDCCH may not be monitored in the inactive downlink BWP. CSI for the inactive downlink BWP is not reported.

Two or more downlink BWPs among one or multiple downlink BWPs configured for a serving cell need not be configured as active downlink BWPs.

One uplink BWP among one or multiple uplink BWPs configured for a serving cell may be configured as an active uplink BWP. An uplink BWP switch is used to deactivate one active uplink BWP and to activate an inactive uplink BWP other than the one active uplink BWP. The uplink BWP switch may be controlled by a BWP field included in downlink control information. The uplink BWP switch may be controlled based on a higher layer parameter.

In the active uplink BWP, an UL-SCH may be transmitted. In the active uplink BWP, a PUCCH may be transmitted. In the active uplink BWP, a PRACH may be transmitted. In the active uplink BWP, an SRS may be transmitted.

In the inactive uplink BWP, no UL-SCH is transmitted. In the inactive uplink BWP, no PUCCH is transmitted. In the inactive uplink BWP, no PRACH is transmitted. In the inactive uplink BWP, no SRS is transmitted.

Two or more uplink BWPs among one or multiple uplink BWPs configured for a serving cell need not be configured as active uplink BWPs.

Hereinafter, aspects of one active downlink BWP and one active uplink BWP will be described in the present embodiment unless otherwise indicated. Hereinafter, in the present embodiment, a case in which an active downlink BWP and an active uplink BWP are not switched is assumed unless otherwise indicated.

Configurations of apparatuses according to the present embodiment will be described below.

Figure 5:
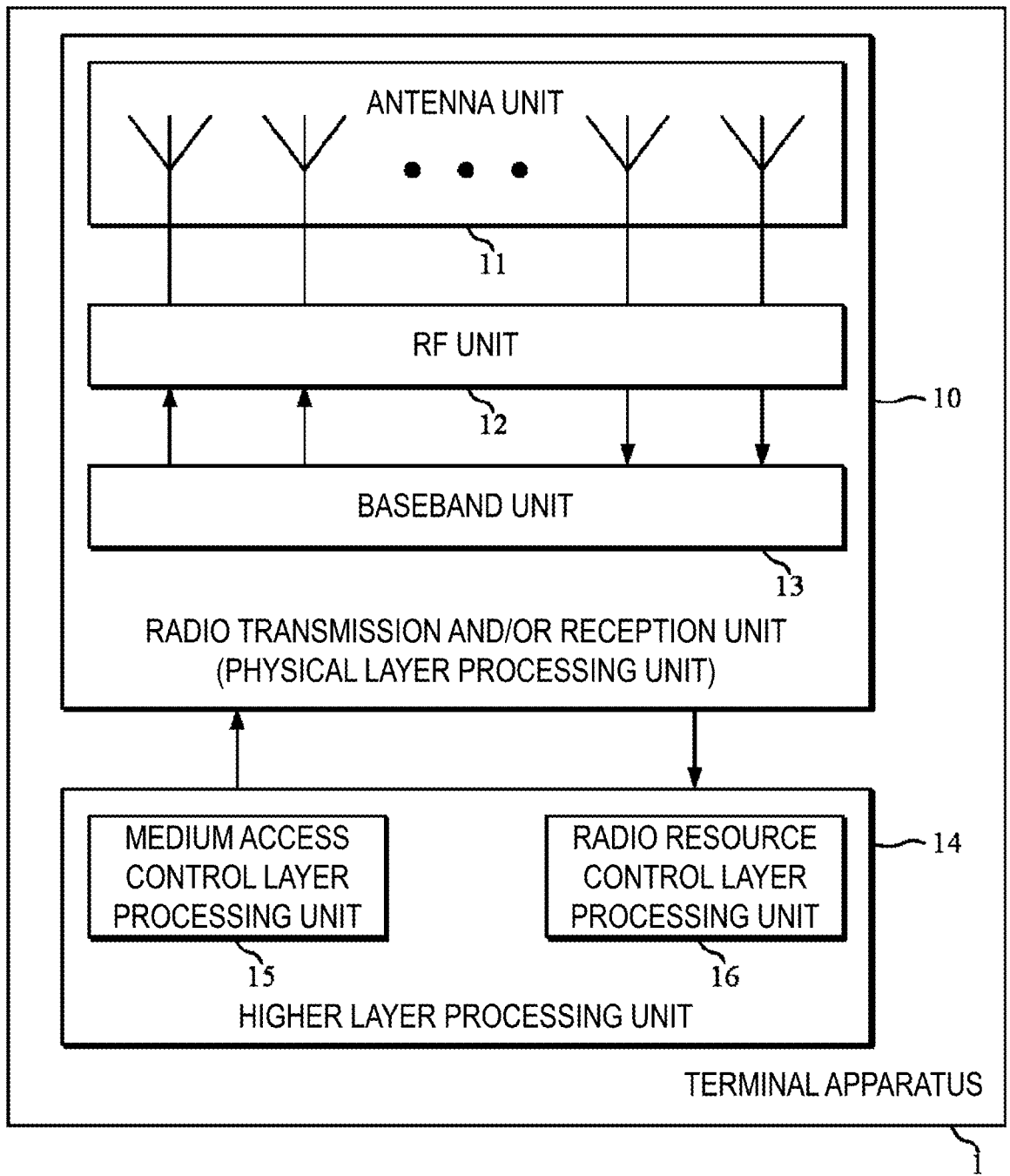
FIG. 5 is a schematic block diagram illustrating a configuration of a terminal apparatus 1 according to the present embodiment.

FIG. 5 is a schematic block diagram illustrating a configuration of the terminal apparatus 1 according to the present embodiment. As illustrated, the terminal apparatus 1 includes a radio transmission and/or reception unit 10 and a higher layer processing unit 14. The radio transmission and/or reception unit 10 is configured to include an antenna part 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport blocks) generated by a user operation or the like, to the radio transmission and/or reception unit 10. The higher layer processing unit 14 performs processing of a Medium Access Control (MAC) layer, a Packet Data Convergence Protocol (PDCP) layer, a Radio Link Control (RLC) layer, and a Radio Resource Control (RRC) layer.

The medium access control layer processing unit 15 included in the higher layer processing unit 14 performs processing of the medium access control layer. The medium access control layer processing unit 15 controls a random access procedure based on various types of configuration information/parameter managed by the radio resource control layer processing unit 16.

The radio resource control layer processing unit 16 included in the higher layer processing unit 14 performs processing of the radio resource control layer. The radio resource control layer processing unit 16 manages various types of configuration information/parameter of the terminal apparatus. The radio resource control layer processing unit 16 sets various types of configuration information/parameter based on a higher layer signal received from the base station apparatus 3. In other words, the radio resource control layer processing unit 16 sets the various types of configuration information/parameter based on the information indicating the various types of configuration information/parameter received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the decoded information to the higher layer processing unit 14. The radio transmission and/or reception unit 10 generates a transmission signal by modulating and coding data, and transmits the signal to the base station apparatus 3.

The RF unit 12 converts (down-converts) a signal received via the antenna unit 11 into a baseband signal through orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal of the frequency domain.

The baseband unit 13 generates an OFDM symbol by performing an Inverse Fast Fourier Transform (IFFT) on the data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmission power. The RF unit 12 is also referred to as a transmission power controller.

Figure 6:
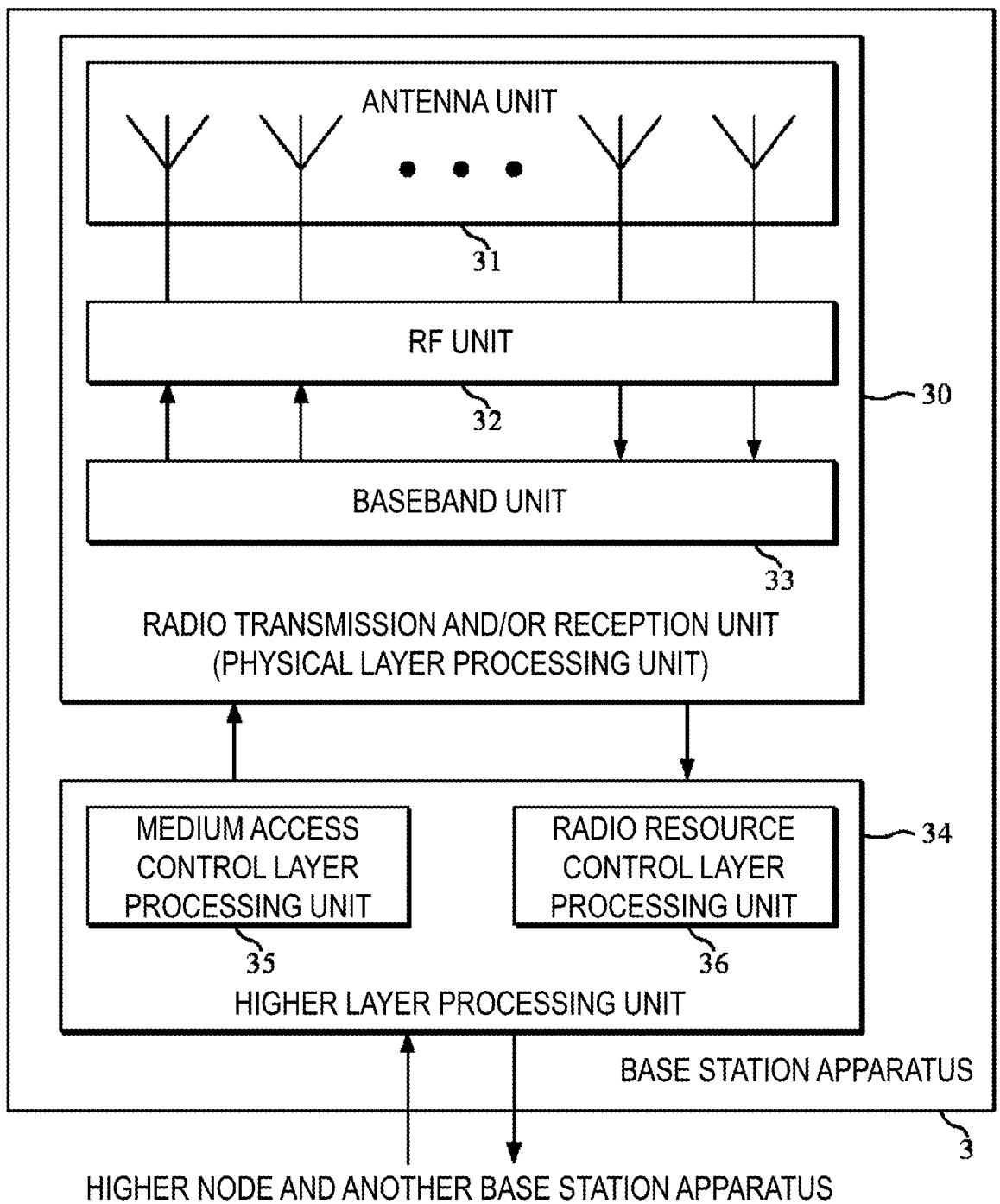
FIG. 6 is a schematic block diagram illustrating a configuration of a base station apparatus 3 according to the present embodiment.

FIG. 6 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of a Medium Access Control (MAC) layer, a Packet Data Convergence Protocol (PDCP) layer, a Radio Link Control (RLC) layer, and a Radio Resource Control (RRC) layer.

The medium access control layer processing unit 35 included in the higher layer processing unit 34 performs processing of the medium access control layer. The medium access control layer processing unit 35 controls a random access procedure based on various types of configuration information/parameter managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (a transport block) allocated to a physical downlink shared channel, system information, an RRC message, a MAC Control Element (CE), and the like, and outputs the generated or acquired data to the radio transmission and/or reception unit 30. Furthermore, the radio resource control layer processing unit 36 manages various types of configuration information/parameter for each of the terminal apparatuses 1. The radio resource control layer processing unit 36 may set various types of configuration information/parameter for each of the terminal apparatuses 1 via higher layer signaling. That is, the radio resource control layer processing unit 36 transmits/broadcasts information indicating various types of configuration information/parameter.

The functionality of the radio transmission and/or reception unit 30 is similar to the functionality of the radio transmission and/or reception unit 10, and thus description thereof is omitted.

Each of the units having the reference numerals 10 to 16 included in the terminal apparatus 1 may be configured as a circuit. Each of the units having the reference numerals 30 to 36 included in the base station apparatus 3 may be configured as a circuit. Each of the units having the reference numerals 10 to 16 included in the terminal apparatus 1 may be configured as at least one processor and a memory coupled to the at least one processor. Each of the units having the reference numerals 30 to 36 included in the base station apparatus 3 may be configured as at least one processor and a memory coupled to the at least one processor.

CRC scrambled with a Radio Network Temporary Identifier (RNTI) may be added to a DCI format. The DCI format with the CRC scrambled with the RNTI added is also referred to as a DCI format with a RNTI.

A PDCCH including the DCI format with the CRC scrambled with the RNTI added is also referred to as a PDCCH with a RNTI, a PDCCH for a RNTI, or a PDCCH addressed to a RNTI.

A Cell Radio Network Temporary Identifier (C-RNTI) may be used for dynamically scheduled unicast transmission. The dynamically scheduled unicast transmission may correspond to a DL-SCH and an UL-SCH. In other words, the dynamically scheduled unicast transmission is either PDSCH transmission or PUSCH transmission. The terminal apparatus 1 may receive (decode) the PDSCH based on detection of the PDCCH addressed to the C-RNTI including a downlink assignment. The terminal apparatus 1 may transmit the PUSCH based on detection of the PDCCH addressed to the C-RNTI including an uplink grant.

A Configured Scheduling Radio Network Temporary Identifier (CS-RNTI) may be used for configured and scheduled unicast transmission. The CS-RNTI may be used for activation and deactivation of the configured and scheduled unicast transmission. The configured and scheduled unicast transmission may correspond to a DL-SCH and an UL-SCH. In other words, the configured and scheduled unicast transmission is either PDSCH transmission or PUSCH transmission.

The configured and scheduled unicast transmission may include downlink Semi-Persistent Scheduling (SPS) and an uplink configured grant.

Figure 7:
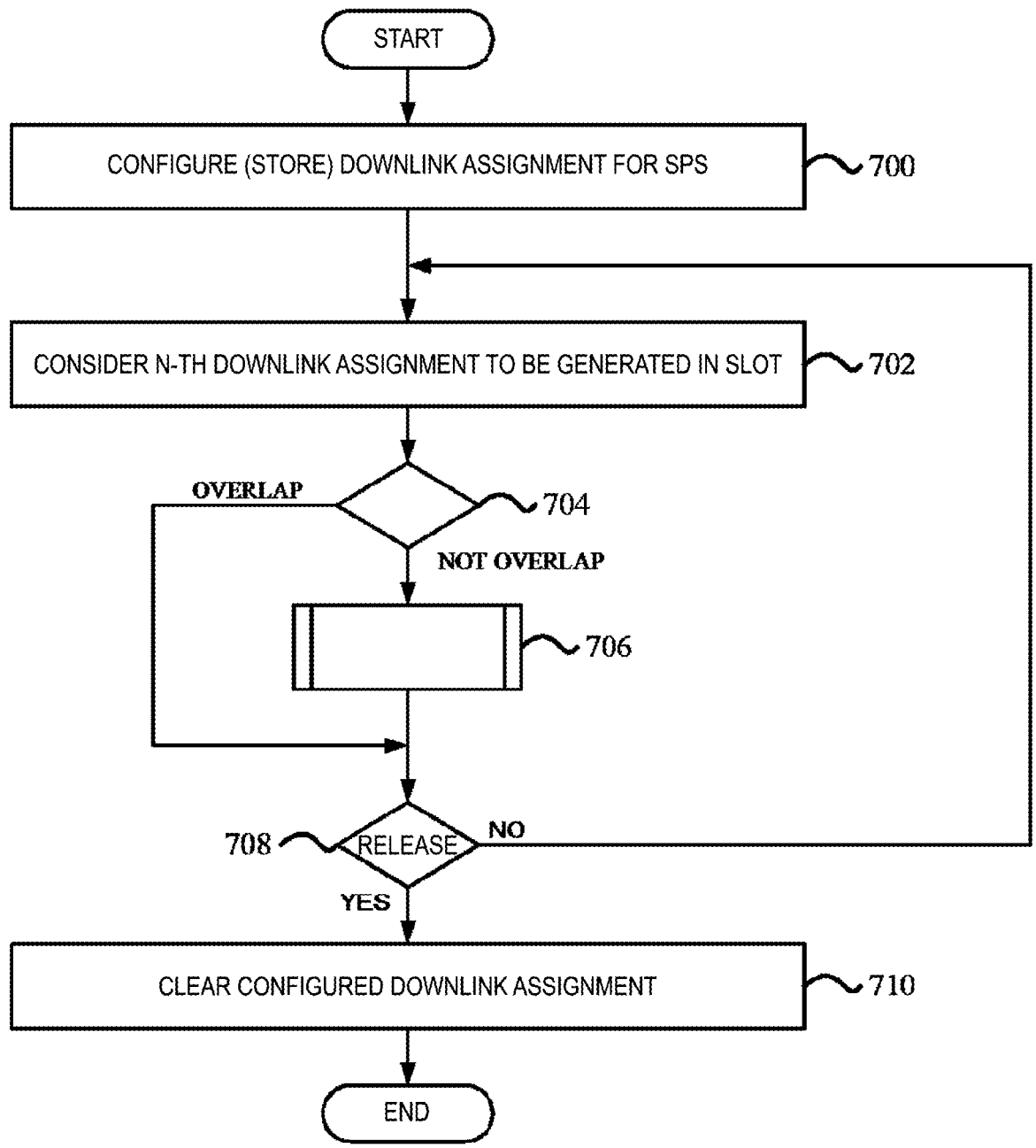
FIG. 7 is a diagram illustrating a flow for describing an example of SPS according to the present embodiment.

SPS according to the present embodiment will be described below. FIG. 7 is a diagram illustrating a flow for describing an example of SPS according to the present embodiment. The processing in FIG. 7 may be performed by a MAC entity (MAC layer) of the radio resource control layer processing unit 16 or the terminal apparatus 1.

In step 700, the terminal apparatus 1 receives a downlink assignment for SPS, configures or stores the downlink assignment for SPS, and proceeds to step 702. The configured or stored downlink assignment is also referred to as a configured downlink assignment. The terminal apparatus 1 may receive the downlink assignment for SPS using a PDCCH addressed to a CS-RNTI.

After the downlink assignment is configured for SPS, the terminal apparatus 1, in step 702, sequentially considers an N-th downlink assignment to be generated in a downlink slot satisfying Equation (1) below, and proceeds to step 704.

$$(N^{frame,\mu}_{slot} \times N_{SFN} + N_{slot}) = [(N^{frame,\mu}_{slot} \times N_{SFN\_start\_SPS} + N_{slot\_start\_SPS}) + N \times N_{periodicity\_SPS} \times N^{frame,\mu}_{slot}/10]$$
$$\text{modulo}(1024 \times N^{frame,\mu}_{slot}) \quad \text{[Equation 1]}$$

$N_{SFN}$ represents a system frame number (SFN) that is a radio frame number. $N_{slot}$ represents a slot number in a radio frame. The $N_{SFN\_start\_SPS}$ and $N_{slot\_start\_SPS}$ are an SFN and a slot for the first transmission of the PDSCH for which configured downlink assignment has been initiated. $N_{periodicity\_SPS}$ is a parameter configured by RRC, and is a period of a configured downlink assignment for SPS. The configured downlink assignment may be implicitly reused according to the period defined by the RRC.

In step 704, the terminal apparatus 1 determines whether the duration of the PDSCH of the configured downlink assignment overlaps a duration of the PDSCH of the downlink assignment received on the PDCCH. In step 704, in a case that the terminal apparatus 1 determines that the duration of the PDSCH of the configured downlink assignment does not overlap the duration of the PDSCH of the downlink assignment received on the PDCCH, the terminal apparatus 1 proceeds to step 706. In step 704, in a case that the terminal apparatus 1 determines that the duration of the PDSCH of the configured downlink assignment overlaps the duration of the PDSCH of the downlink assignment received on the PDCCH, the terminal apparatus 1 proceeds to step 708.

In step 706, the terminal apparatus 1 attempts to decode a transport block received in the duration of the PDSCH of the configured downlink assignment. In other words, in a case that the terminal apparatus 1 determines that the duration of the PDSCH of the configured downlink assignment overlaps the duration of the PDSCH of the downlink assignment received on the PDCCH in step 704, the terminal apparatus 1 need not attempt to decode the transport block in the PDSCH corresponding to the configured downlink assignment. In other words, in a case that the terminal apparatus 1 has not found a PDCCH addressed to a C-RNTI, downlink transmission according to the configured downlink assignment is assumed. In addition, in a case that the terminal apparatus 1 has found a PDCCH addressed to a C-RNTI (downlink assignment), a downlink assignment in which allocation of the PDCCH addressed to the C-RNTI (downlink assignment) is configured is overridden.

FIG. 8 is a diagram illustrating a detailed example of step 706 according to the present embodiment. Step 706 may include steps 706a to 706g. The terminal apparatus 1 may perform processing sequentially from processing of step 706a. In step 706a, the terminal apparatus 1 may indicate the physical layer to receive a transport block on the DL-SCH according to the configured downlink assignment in the duration of the PDSCH of the configured downlink assignment and deliver the transport block to a HARQ entity. In step 706b, the terminal apparatus 1 may set the HARQ process ID to the HARQ process ID associated with the duration of the PDSCH. The HARQ process ID associated with the duration of the PDSCH may be provided at least based on a slot number including the duration of the PDSCH. In step 706c, the terminal apparatus 1 considers the NDI bit to have been toggled. In 706d, the terminal apparatus 1 indicates the presence of the configured downlink assignment to the HARQ entity and delivers HARQ information to the HARQ entity.

Step 706e may be performed by the HARQ entity included in the MAC entity of the terminal apparatus 1. The HARQ entity manages HARQ processes. In step 706e, the terminal apparatus 1 may allocate the transport block and the HARQ information received from the physical layer to the HARQ process indicated by the HARQ information.

Steps 706f and 706g may be performed in the HARQ process of the terminal apparatus 1. In step 706f, the terminal apparatus 1 may attempt to decode the received transport block. In step 706g, the terminal apparatus 1 indicates the physical layer to generate a HARQ-ACK of data in the transport block.

In step 708, the terminal apparatus 1 determines whether deactivation (release) of SPS has been indicated. In step 708, in a case that the terminal apparatus 1 determines that deactivation (release) of SPS has been indicated, the terminal apparatus 1 proceeds to step 710 and clears the configured downlink assignment. In step 708, in a case that the terminal apparatus 1 determines that deactivation (release) of SPS is not indicated, the terminal apparatus 1 proceeds to step 702.

In step 704, in order for the terminal apparatus 1 to determine whether the duration of the PDSCH of the configured downlink assignment overlaps a duration of the PDSCH of downlink assignment received on the PDCCH, the PDCCH needs to be detected. However, there may be insufficient time for the determination to be made after detecting the PDCCH. That is, the PDCCH, in step 704, needs to meet a predetermined time requirement.

Some or all of the timing and time in the present embodiment may include the influence of timing advance.

Figure 9:
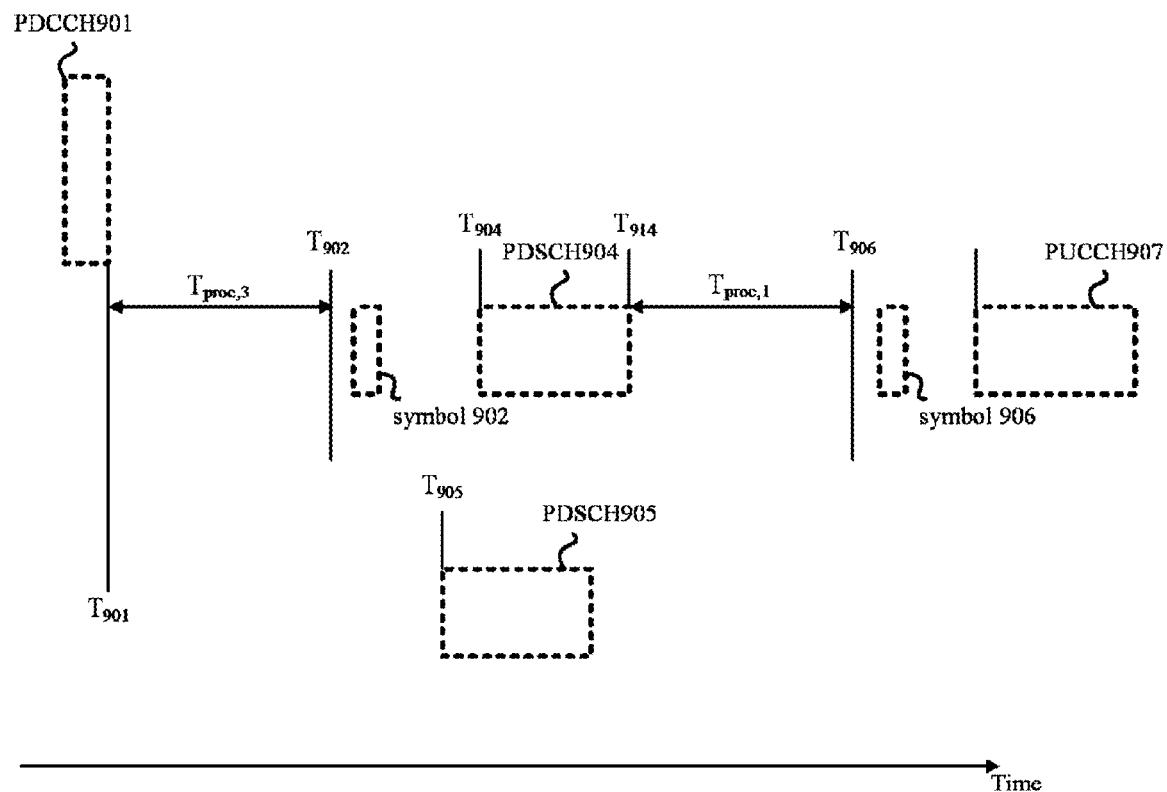
FIG. 9 is a diagram for describing a time requirement for a PDCCH according to the present embodiment.

The time requirement for the PDCCH, in step 704, will be described below. FIG. 9 is a diagram for describing a time requirement for a PDCCH according to the present embodiment.

A PDCCH 901 includes downlink control information for scheduling a PDSCH 904. The PDSCH 904 is a PDSCH corresponding to the downlink assignment included in the downlink control information received on the PDCCH 901. A PDSCH 905 is a PDSCH corresponding to the configured downlink assignment.

T 901 is the time at which the last OFDM symbol of the PDCCH 901 ends. T 902 is the time after $T_{proc,3}$ from T 901. A symbol 902 is the first (next) downlink OFDM symbol at which a CP is started after T 902.

T 904 is the time at which the first OFDM symbol of the PDSCH 904 begins. T 905 is the time at which the first OFDM symbol of the PDSCH 905 begins. The time at which the last OFDM symbol on the channel ends is also referred to as the end of the last OFDM symbol on the channel, the time at which the channel ends, or the end of the channel. The time at which the first OFDM symbol of the channel begins is also referred to as the beginning of the first OFDM symbol on the channel, the time at which the channel begins, and the head of the channel. The beginning of the OFDM symbol may be the beginning of the CP of the OFDM symbol.

The symbol 902 is also referred to as a symbol L3. A symbol 906 is also referred to as a symbol L1.

T 914 is the time at which the last OFDM symbol of the PDSCH 904 ends. T 906 is the time after $T_{proc,1}$ from T 914. The symbol 906 is the first (next) uplink OFDM symbol at which a CP is started after T 906.

A PUCCH 907 is used to transmit a HARQ-ACK. Here, the HARQ-ACK is a HARQ-ACK for the transport block of the PDSCH 904. The PUCCH 907 is identified by a field of the downlink control information included in the PDCCH 901.

$T_{proc,1}$ may be provided at least based on a parameter μ'. Here, the parameter μ' may correspond to the smallest one of $μ_{PDCCH}$, $μ_{PDSCH}$, and $μ_{UL}$. $T_{proc,3}$ may be provided at least based on a parameter μ". Here, the parameter μ" may correspond to the smaller one of $μ_{PDCCH}$ and $μ_{PDSCH}$. $μ_{PDCCH}$ corresponds to a downlink subcarrier space configuration of the PDCCH 901. $μ_{PDSCH}$ corresponds to downlink subcarrier space configurations of the PDSCH 904 and the PDSCH 905. $μ_{UL}$ corresponds to the subcarrier space of the PUCCH 907. In a case that the PDCCH 901, the PDSCH 904, and the PDSCH 905 are transmitted on the same downlink BWP, $μ_{PDCCH}$ and $μ_{PDSCH}$ have the same value.

$T_{proc,1}$ may be provided using Equation (2) below. $T_{proc,3}$ may be provided using Equation (3) or Equation (4) below.

$$T_{proc,1} = (N_1 + d_{1,1})(2048 + 144) \cdot κ 2^{-μ'} \cdot T_c \qquad \text{[Equation 2]}$$

$$T_{proc,3} = (N_3 + d_{1,1})(2048 + 144) \cdot κ 2^{-μ''} \cdot T_c \qquad \text{[Equation 3]}$$

$$T_{proc,3} = N_3 \cdot (2048 + 144) \cdot κ 2^{-μ''} \cdot T_c \qquad \text{[Equation 4]}$$

$N_1$ may be provided at least based on a capability of the terminal apparatus 1 and the parameter μ'. $N_3$ may be provided at least based on a capability parameter μ" of the terminal apparatus 1. The value of $N_1$ corresponding to the parameter μ' of the first value may be different from the value of $N_3$ corresponding to the parameter μ" of the first value, or the values may be independently defined. The value of $N_1$ corresponding to the parameter μ' of the first value may be the same as the value of $N_3$ corresponding to the parameter μ" of the first value. The terminal apparatus 1 may transmit information indicating the capability of the terminal apparatus 1 to the base station apparatus 3. The information indicating the capability of the terminal apparatus 1 may be included in a RRC message.

A value of $d_{1,1}$ may be provided based on at least the mapping of the PDSCH, the position (index) of the last OFDM symbol of the PDSCH, and some or all of the number of OFDM symbols allocated for the PDSCH. In a case that $T_{proc,3}$ is calculated, a value of $d_{1,1}$ may be set to 0 regardless of the mapping of the PDSCH, the position (index) of the last OFDM symbol of the PDSCH, and the number of OFDM symbols allocated for the PDSCH.

In a case that the first uplink OFDM symbol of the PUCCH 907 starts no earlier than at the symbol 906, the terminal apparatus 1 provides an effective HARQ-ACK corresponding to the PDSCH 904. In a case that the first uplink OFDM symbol of the PUCCH 907 starts earlier than at the symbol 906, the terminal apparatus 1 need not provide an effective HARQ-ACK corresponding to the PDSCH 904.

In a case that the duration of the PDSCH 904 overlaps the duration of the PDSCH 905 and the first downlink OFDM symbol of the PDSCH 905 begins no earlier than the symbol 902, the terminal apparatus 1 may perform some or all of the following processing A1, processing A2, and processing A3.

(Processing A1) Receive a transport block of the PDSCH 904.

(Processing A2) Deliver the downlink control information of the PDCCH 901 to the MAC layer of the terminal apparatus 1.

(Processing A3) Consider the PDCCH 901 to satisfy a predetermined time requirement for step 704.

In a case that the duration of the PDSCH 904 overlaps the duration of the PDSCH 905 and the first downlink OFDM symbol of the PDSCH 905 begins earlier than the symbol 902, the terminal apparatus 1 may perform (be allowed to perform) some or all of the following processing B1 to processing B5.

(Processing B1) Not receive the transport block of the PDSCH 904.

(Processing B2) Not deliver the downlink control information of the PDCCH 901 to the MAC layer of the terminal apparatus 1.

(Processing B3) Consider the PDCCH 901 to not satisfy a predetermined time requirement for 704.

(Processing B4) Ignore or discard the downlink control information of the PDCCH 901.

(Processing B5) Ignore or discard the PDCCH 901.

In other words, in a case that the PDSCH of the configured downlink assignment begins no earlier than a predetermined symbol (the symbol 902) identified from the last symbol of the PDCCH, the PDCCH is considered to satisfy the predetermined time requirement. In a case that the PDSCH of the configured downlink assignment begins no earlier than the predetermined symbol (symbol 902) identified from the last symbol of the PDCCH, the PDCCH is considered in step 704 in FIG. 7.

In other words, in a case that the PDSCH of the configured downlink assignment begins earlier than a predetermined symbol (the symbol 902) identified from the last symbol of the PDCCH, the PDCCH is considered to not satisfy the predetermined time requirement. In a case that the PDSCH of the configured downlink assignment begins earlier than the predetermined symbol (symbol 902) identified from the last symbol of the PDCCH, the PDCCH need not be considered in step 704 in FIG. 7.

The base station apparatus 3 may transmit the PDCCH corresponding to the PDSCH of the duration overlapping the duration of the PDSCH of the configured downlink assignment at a timing at which the predetermined time requirement is satisfied. In other words, the base station apparatus 3 may transmit a PDCCH corresponding to the PDSCH of the duration overlapping the duration of the PDSCH of the configured downlink assignment at a timing at which the PDSCH of the configured downlink assignment begins no earlier than the predetermined symbol (the symbol 902) identified from the last symbol of the PDCCH. The base station apparatus 3 need not transmit the PDCCH corresponding to the PDSCH of the duration overlapping the duration of the PDSCH of the configured downlink assignment at a timing at which the PDSCH of the configured downlink assignment begins earlier than the predetermined symbol (the symbol 902) identified from the last symbol of the PDCCH.

Figure 10:
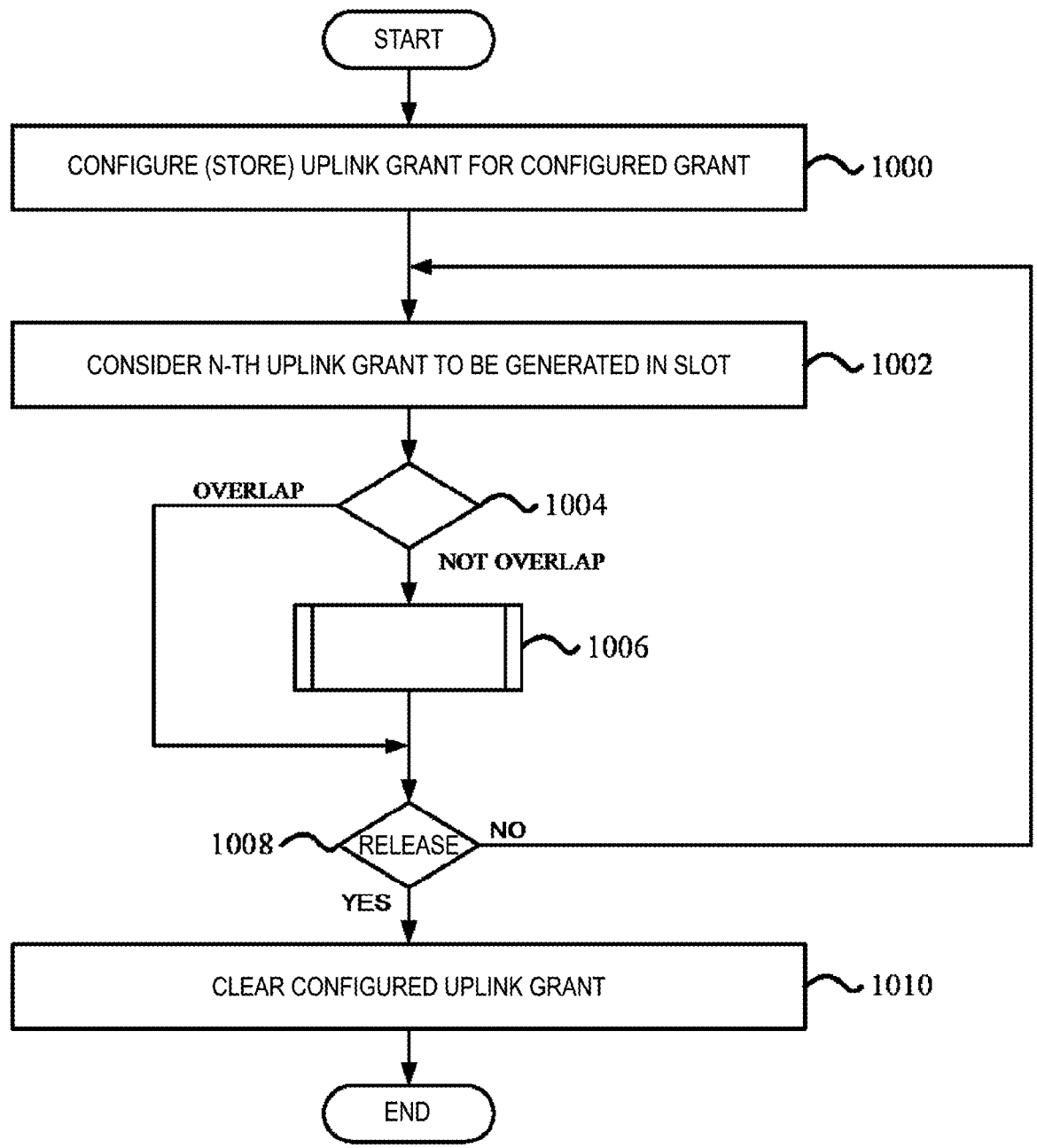
FIG. 10 is a diagram illustrating a flow for describing an example of a configured grant according to the present embodiment.

Hereinafter, a configured grant of the present embodiment will be described. FIG. 10 is a diagram illustrating a flow for describing an example of a configured grant according to the present embodiment. The processing in FIG. 10 may be performed by a MAC entity (MAC layer) of the radio resource control layer processing part 16 or the terminal apparatus 1.

In step 1000, the terminal apparatus 1 receives an uplink grant for a configured grant, configures or stores the uplink grant for the configured grant, and proceeds to step 1002. The configured or stored uplink grant is also referred to as a configured uplink grant. The terminal apparatus 1 may receive the uplink grant for the configured grant by using the PDCCH addressed to the CS-RNTI. The terminal apparatus 1 may receive a RRC message including the configured uplink grant. The configured uplink grant may be configured using RRC.

After the uplink grant is configured for the configured grant, the terminal apparatus 1, in step 1002, sequentially considers an N-th uplink grant to be generated in an uplink slot satisfying Equation (5) below, and proceeds to step 1004. In step 1002, a different equation from Equation (5) may be used.

$$[(N^{slot}_{symb} \times N^{frame,\mu}_{slot} \times N_{SFN}) + (N^{slot}_{symb} \times N_{slot}) + N_{slot}] = [(N^{slot}_{symb} \times N^{frame,\mu}_{slot} \times N_{SFN\_start\_CG} + N^{slot}_{symb} \times N_{slot\_start\_CG}) + N \times N_{periodicity\_CG}] \text{ modulo}(1024 \times N^{slot}_{symb} \times N^{frame,\mu}_{slot}), \text{ for all } N >= 0. \quad \text{[Equation 5]}$$

$N_{SFN}$ represents a system frame number (SFN) that is a radio frame number. $N_{slot}$ represents a slot number in a radio frame. $N_{SFN\_start\_CG}$, $N_{slot\_start\_CG}$, and $N_{symb\_start\_CG}$ are SFNs, slots, and OFDM symbols of first transmission of the PUSCH for which configured downlink assignment has been initiated. $N_{periodicity\_CG}$ is a parameter configured by the RRC and is a period of the configured uplink grant for the configured grant. The configured uplink grant may be implicitly reused according to the period defined by the RRC.

In step 1004, the terminal apparatus 1 determines whether the duration of the PUSCH of the configured uplink grant overlaps the duration of the PUSCH of the uplink grant received on the PDCCH. In step 1004, in a case that the terminal apparatus 1 determines that the duration of the PUSCH of the configured uplink grant does not overlap the duration of the PUSCH of the uplink grant received on the PDCCH, the terminal apparatus 1 proceeds to step 1006. In step 1004, in a case that the terminal apparatus 1 determines that the duration of the PUSCH of the configured uplink grant overlaps the duration of the PUSCH of the uplink grant received on the PDCCH, the terminal apparatus 1 proceeds to step 1008.

In step 1006, the terminal apparatus 1 transmits the transport block using the PUSCH of the configured uplink grant. In other words, in step 1004, in a case that the terminal apparatus 1 determines that the duration of the PUSCH of the configured uplink grant overlaps the duration of the PUSCH of the uplink grant received on the PDCCH, the terminal apparatus 1 need not transmit the transport block using the PUSCH corresponding to the configured uplink grant. In other words, in a case that the terminal apparatus 1 has not found a PDCCH addressed to a C-RNTI (uplink grant), uplink transmission according to the configured uplink grant is assumed. In addition, in a case that the terminal apparatus 1 has found a PDCCH addressed to a C-RNTI (uplink grant), the uplink grant to which allocation of the PDCCH addressed to the C-RNTI (uplink grant) is configured is overridden.

FIG. 11 is a diagram illustrating a detailed example of step 1006 of the present embodiment. Step 1006 may include steps 1006a to 706i. The terminal apparatus 1 may sequentially perform the processing from step 1006a. In step 1006a, the terminal apparatus 1 may set a HARQ process ID to a HARQ process ID associated with the duration of the PUSCH. The HARQ process ID associated with the duration of the PUSCH may be provided at least based on a slot number including the duration of the PUSCH. In step 1006b, the terminal apparatus 1 considers the NDI bit to have been toggled. In step 1006c, the terminal apparatus 1 delivers the associated HARQ information and the configured uplink grant to the HARQ entity.

Steps 1006d to 1006f may be processed by the HARQ entity included in the MAC entity of the terminal apparatus 1. The HARQ entity manages HARQ processes. In step 1006d, the terminal apparatus 1 obtains the MAC PDU transmitted from the 'Multiplexing and assembly' entity. In step 1006e, the terminal apparatus 1 delivers the MAC PDU, the configured uplink grant, and the HARQ information of the transport block (MAC PDU) to the HARQ process. In step 1006f, the terminal apparatus 1 indicates the HARQ process to trigger initial transmission.

Steps 1006g to 1006i may be processed in the HARQ process of the terminal apparatus 1. In step 1006g, the MAC PDU is stored in the HARQ buffer. In step 1006h, the terminal apparatus 1 stores the configured uplink grant received from the HARQ entity. In step 1006i, the terminal apparatus 1 indicates the physical layer to generate transmission in accordance with the uplink grant stored in step 1006h.

In step 1008, the terminal apparatus 1 determines whether deactivation (release) of the configured grant has been indicated. In step 1008, in a case that the terminal apparatus 1 determines that deactivation (release) of the configured grant has been indicated, the terminal apparatus 1 proceeds to step 1010 and clears the configured uplink grant. In step 1008, in a case that the terminal apparatus 1 determines that deactivation (release) of the configured grant has not been indicated, the terminal apparatus 1 proceeds to step 1002.

In step 1004, in order for the terminal apparatus 1 to determine whether the duration of the PUSCH of the configured uplink grant overlaps the duration of the PUSCH of the uplink grant received on the PDCCH, the PDCCH needs to be detected. However, there may be insufficient time for the determination to be made after detecting the PDCCH. That is, the PDCCH in step 1004 needs to meet a predetermined time requirement.

Figure 12:
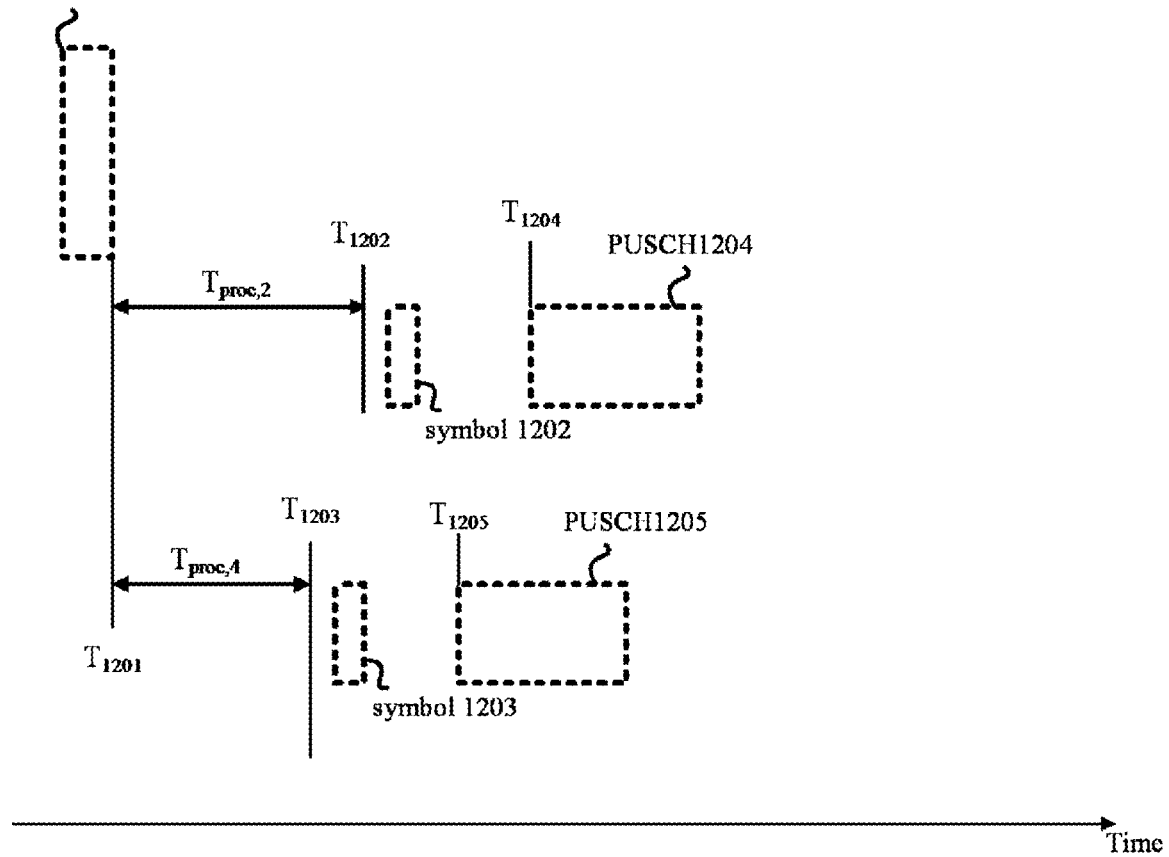
FIG. 12 is a diagram for describing a time requirement for a PDCCH according to the present embodiment.

The time requirement for the PDCCH in step 1004 will be described below. FIG. 12 is a diagram for describing a time requirement for a PDCCH according to the present embodiment.

A PDCCH 1201 includes downlink control information for scheduling a PUSCH 1204. The PUSCH 1204 is a PUSCH corresponding to an uplink grant included in the downlink control information received on the PDCCH 1201. A PUSCH 905 is a PUSCH corresponding to a configured uplink grant.

T 1201 is the time at which the last OFDM symbol of the PDCCH 1201 ends. T 1202 is the time after $T_{proc,2}$ from T 1201. A symbol 1202 is the first (next) uplink OFDM symbol at which the CP begins after T 1202. T 1203 is the time after $T_{proc,4}$ from T 1201. A symbol 1204 is the first (next) uplink OFDM symbol at which the CP begins after T 1204.

The symbol 1202 is also referred to as a symbol L2. The symbol 1203 is also referred to as a symbol L4.

T 1204 is the time at which the first OFDM symbol of the PUSCH 1204 begins. T 1205 is the time at which the first OFDM symbol of the PUSCH 1205 begins.

$T_{proc,2}$ and $T_{proc,4}$ may be provided at least based on a parameter $\mu'''$. Here, the parameter $\mu'''$ may correspond to the smaller one of $\mu_{DL}$ and $\mu_{PUSCH}$. $\mu_{D1}$ corresponds to a downlink subcarrier space configuration in which the PDCCH 1201 has been transmitted. $\mu_{PUSCH}$ corresponds to an uplink subcarrier space in which the PUSCH 1204 and/or the PUSCH 1205 are transmitted.

$T_{proc,2}$ may be provided using Equation (6) below. $T_{proc,4}$ may be provided using any one of Equation (7) to Equation (10) below.

$$T_{proc,2}=(N_2+d_{2,1})(2048+144)\cdot\kappa 2^{-\mu'''}\cdot T_c \quad \text{[Equation 6]}$$

$$T_{proc,4}=(N_2+d_{2,1})(2048+144)\cdot\kappa 2^{-\mu'''}\cdot T_c \quad \text{[Equation 7]}$$

$$T_{proc,4}=(N_4+d_{2,1})(2048+144)\cdot\kappa 2^{-\mu'''}\cdot T_c \quad \text{[Equation 8]}$$

$$T_{proc,4}=N_2\cdot(2048+144)\cdot\kappa 2^{-\mu'''}\cdot T_c \quad \text{[Equation 9]}$$

$$T_{proc,4}=N_4\cdot(2048+144)\cdot\kappa 2^{-\mu'''}\cdot T_c \quad \text{[Equation 10]}$$

$N_2$ and $N_4$ may be provided at least based on a capability of the terminal apparatus 1 and the parameter $\mu'''$. The value of $N_2$ corresponding to the parameter $\mu'''$ of the first value may be different from the value of $N_4$ corresponding to the parameter $\mu'''$ of the first value, or the values may be independently defined. The value of $N_2$ corresponding to the parameter $\mu'''$ of the first value may be the same as the value of $N_4$ corresponding to the parameter $\mu'''$ of the first value.

In a case that the first symbol allocated to the PUSCH 1204 includes only a DMRS, the value of $d_{2,1}$ may be zero. In a case that the first symbol allocated to the PUSCH 1204 does not include only a DMRS, the value of $d_{2,1}$ may be 1. The first symbol allocated to the PUSCH 1204 including only the DMRS may be the first symbol allocated to the PUSCH 1204 not including a PUSCH. The first symbol allocated to the PUSCH 1204 including only the DMRS may be the first symbol allocated to the PUSCH 1204 including a PUSCH and a DMRS. In a case that $T_{proc,4}$ is calculated, $d_{2,1}$ may be set to 0 regardless of whether the first symbol allocated to the PUSCH 1204 includes only the DMRS.

In a case that the duration of the PUSCH 1204 overlaps the duration of the PUSCH 1205, the first uplink OFDM symbol of the PUSCH 1204 begins no earlier than the symbol 1202, and the first uplink OFDM symbol of the PUSCH 1205 begins no earlier than the symbol 1202, the terminal apparatus 1 may perform some or all of the following processing C1, processing C2, and processing C3.

(Processing C1) Transmit a transport block using the PUSCH 1204.

(Processing C2) Deliver the downlink control information of the PDCCH 1201 to the MAC layer of the terminal apparatus 1.

(Processing C3) Consider the PDCCH 1201 to satisfy a predetermined time requirement for step 1004.

In a case that the first uplink OFDM symbol of the PUSCH 1204 begins earlier than the symbol 1202, or the duration of the PUSCH 1204 overlaps the duration of the PUSCH 1205, and the first uplink OFDM symbol of the PUSCH 1205 begins earlier than the symbol 1202, the terminal apparatus 1 may perform (be allowed to perform) some or all of the following processing D1 to processing D5.

(Processing D1) Not transmit a transport block using the PUSCH 1204.

(Processing D2) Not deliver the downlink control information of the PDCCH 1201 to the MAC layer of the terminal apparatus 1.

(Processing D3) Consider the PDCCH 1201 to not satisfy the predetermined time requirement for 1004.

(Processing D4) Ignore or discard the downlink control information of the PDCCH 1201.

(Processing D5) Ignore or discard the PDCCH 1201.

Alternatively, in a case that the first uplink OFDM symbol of the PUSCH 1204 begins no earlier than the symbol 1202 and the first uplink OFDM symbol of the PUSCH 1205 begins no earlier than the symbol 1203, the terminal apparatus 1 may perform some or all of the above-described processing C1, processing C2, and processing C3. In a case that the first uplink OFDM symbol of the PUSCH 1204 begins earlier than the symbol 1202, or the first uplink OFDM symbol of the PUSCH 1205 begins earlier than the symbol 1203, the terminal apparatus 1 may perform (be allowed to perform) some or all of the following processing D1 to processing D5.

In other words, in order for the PDCCH to satisfy the predetermined time requirement, the PUSCH of the configured uplink grant needs to begin no earlier than a predetermined symbol (the symbol 1202 or symbol 1203) identified from the last symbol of the PDCCH.

In other words, in a case that the PUSCH of the configured uplink grant begins earlier than a predetermined symbol (the symbol 1202 or symbol 1203) identified from the last symbol of the PDCCH, the PDCCH is considered to not satisfy the predetermined time requirement. In a case that the PUSCH of the configured uplink grant begins earlier than the predetermined symbol (the symbol 1202 or symbol 1203) identified from the last symbol of the PDCCH, the PDCCH need not be considered in step 1004 in FIG. 10.

The base station apparatus 3 may transmit the PDCCH corresponding to the PUSCH with the duration overlapping the duration of the PUSCH of the configured uplink grant at a timing at which the predetermined time requirement is satisfied. In other words, the base station apparatus 3 may transmit a PDCCH corresponding to the PUSCH of the duration overlapping the duration of the PUSCH of the configured uplink grant at a timing at which the PUSCH of the configured uplink grant begins no earlier than the predetermined symbol (the symbol 1202 or symbol 1203) identified from the last symbol of the PDCCH. In other words, the base station apparatus 3 may transmit the PDCCH corresponding to the PUSCH of the duration overlapping the duration of the PUSCH of the configured uplink grant at a timing at which the PUSCH corresponding to the PDCCH begins no earlier than the predetermined symbol (the symbol 1202) identified from the last symbol of the PDCCH. The base station apparatus 3 need not transmit the PDCCH corresponding to the PUSCH of the duration overlapping the duration of the PUSCH of the configured uplink grant at a timing at which the predetermined time requirement is not satisfied.

Hereinafter, various aspects of the terminal apparatus 1 and the base station apparatus 3 according to the present embodiment will be described.

(1) A first aspect of the present embodiment is a terminal apparatus 1 including a receiver configured to receive, in one downlink BWP of one serving cell, downlink control information used to schedule a second PDSCH for a transport block in a PDCCH, cause a duration of a first PDSCH corresponding to a configured downlink assignment to overlap a duration of the second PDSCH in the one downlink BWP, and (i) receive the transport block and/or (ii) deliver the downlink control information to a MAC layer based on the fact that a first downlink symbol of the first PDSCH begins no earlier than a symbol L1, and a MAC layer processing unit configured to process the MAC layer, in which the symbol L1 is defined as a first (next) downlink symbol at which a CP begins after an end of a last downlink symbol of the PDCCH after a predetermined period of time. In the first aspect, the predetermined period of time may be $T_{proc,3}$.

(2) A second aspect of the present embodiment is a terminal apparatus 1 including a MAC layer processing unit configured to indicate the presence of a configured downlink assignment to a HARQ entity at least based on the fact that, in one downlink BWP of one serving cell, a duration of a first PDSCH corresponding to the configured downlink assignment does not overlap a duration of a second PDSCH corresponding to a PDCCH, and a receiver configured to, in the one downlink BWP, receive downlink control information to be used to schedule the second PDSCH on the PDCCH.

(3) In the second aspect of the present embodiment, the PDCCH to be used for the determination is a PDCCH satisfying a predetermined time requirement, and the predetermined time requirement is that a first downlink symbol of the first PDSCH is not earlier than a first (next) downlink symbol at which a CP begins after a predetermined period of time after a last symbol of the PDCCH.

(4) In the second aspect of the present embodiment, in a case that, in the one downlink BWP, the duration of the first PDSCH corresponding to the configured downlink assignment overlaps the duration of the second PDSCH corresponding to the PDCCH, the terminal apparatus 1 expects the first PDSCH to satisfy the predetermined time requirement, and the predetermined time requirement is that the first downlink symbol of the first PDSCH is not earlier than the first (next) downlink symbol at which the CP begins after the last symbol of the PDCCH after the predetermined period of time.

(5) In the first and second aspects of the present embodiment, the predetermined period of time is provided at least based on a parameter µ'', the parameter µ'' corresponds to a smaller one of $\mu_{PDCCH}$ and $\mu_{PDSCH}$, $\mu_{PDCCH}$ corresponds to a first subcarrier space configuration of downlink in which the PDCCH is transmitted, and $\mu_{PDSCH}$ corresponds to a second subcarrier space configuration of downlink in which the first PDSCH and the second PDSCH are transmitted.

(6) A third aspect of the present embodiment is a terminal apparatus 1 including a receiver configured to receive, in one downlink BWP of one serving cell, downlink control information used to schedule a second PUSCH for a transport block in a PDCCH, cause a duration of a first PUSCH corresponding to configured uplink grant to overlap a duration of the second PUSCH in the one uplink BWP of the one serving cell, and (i) transmit the transport block and/or (ii) deliver the downlink control information to a MAC layer based on the fact that a first uplink symbol of the first PUSCH begins no earlier than a symbol Lx, and a MAC layer processing unit configured to process the MAC layer, in which the symbol Lx is defined as a first (next) uplink symbol at which a CP begins after an end of a last downlink symbol of the PDCCH after a predetermined period of time. In the third aspect, the symbol Lx may be a symbol L2 (the symbol 1202) or a symbol L4 (the symbol 1203). In the third aspect, the predetermined period of time may be $T_{proc,2}$ or $T_{proc,4}$.

(7) A fourth aspect of the present embodiment is a terminal apparatus 1 including a MAC layer processing unit configured to deliver a configured uplink grant to a HARQ entity at least based on the fact that, in one uplink BWP of one serving cell, a duration of a first PUSCH corresponding to the configured uplink grant does not overlap a duration of a second PUSCH corresponding to a PDCCH, and a receiver configured to, in the one downlink BWP of the one serving cell, receive downlink control information to be used to schedule the second PUSCH on the PDCCH.

(8) In the fourth aspect of the present embodiment, the PDCCH to be used for the determination is a PDCCH satisfying a predetermined time requirement, and the predetermined time requirement is that a first uplink symbol of the first PUSCH is not earlier than a first (next) uplink symbol at which a CP begins after a predetermined period of time after a last symbol of the PDCCH.

(9) In the fourth aspect of the present embodiment, in a case that, in the one uplink BWP, the duration of the first PUSCH overlaps the duration of the second PUSCH, the terminal apparatus 1 expects the first PUSCH to satisfy the predetermined time requirement, and the predetermined time requirement is that the first uplink symbol of the first PUSCH is not earlier than the first (next) uplink symbol at which the CP begins after the last symbol of the PDCCH after the predetermined period of time.

(10) In the third and fourth aspects of the present embodiment, the predetermined period of time of time is provided at least based on a parameter $\mu'''$, the parameter $\mu'''$ corresponds to a smaller one of $\mu_{DL}$ and $\mu_{PUSCH}$, $\mu_{DL}$ corresponds to a first subcarrier space configuration of downlink in which the PDCCH is transmitted, and upuscu corresponds to a second subcarrier space configuration of uplink in which the first PUSCH and the second PUSCH are transmitted.

These aspects enable the terminal apparatus 1 and the base station apparatus 3 to efficiently perform communication.

A program running on the base station apparatus 3 and the terminal apparatus 1 according to the present invention may be a program that controls a Central Processing Unit (CPU) (a program that causes a computer to function) and the like to realize the functions of the above-described embodiment according to the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially realized by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in the case where a circuit integration technology that replaces LSI were to appear due to advances in semiconductor technology, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an audiovisual (AV) apparatus, a kitchen apparatus, a cleaning or washing machine, an air-conditioning apparatus, office equipment, a vending machine, and other household apparatuses.

Although the embodiments of the present invention have been described in detail above referring to the drawings, the specific configuration is not limited to the embodiments and includes, for example, an amendment to a design that falls within the scope that does not depart from the gist of the present invention. Various modifications are possible within the scope of the present invention defined by claims, and an embodiment that is made by suitably combining technical means disclosed according to the different embodiments is also included in the technical scope of the present invention. Furthermore, a configuration in which constituent elements described in the respective embodiments exhibiting similar effects are substituted for one another is also included in the technical scope of the present invention.

The invention claimed is:

1. A terminal apparatus comprising:
   transmission circuitry configured to transmit, in one uplink Bandwidth Part (BWP) of one serving cell, a first Physical Uplink Shared Channel (PUSCH) corresponding to a configured uplink grant; and
   reception circuitry configured to receive, in one downlink BWP of the one serving cell, downlink control information on a Physical Downlink Control Channel (PDCCH), that schedules a second PUSCH, wherein
   in the one uplink BWP, in a case that a duration of the first PUSCH overlaps a duration of the second PUSCH, an initial uplink symbol of the first PUSCH is expected to not be earlier than an initial uplink symbol at which a Cyclic Prefix (CP) begins after a predetermined period of time after a last symbol of the PDCCH.

2. The terminal apparatus according to claim 1, wherein
   the predetermined period of time is provided at least based on a parameter $\mu'''$,
   the parameter $\mu'''$ corresponds to a smaller one of $\mu_{DL}$ and $\mu_{PUSCH}$,
   the $\mu_{DL}$ corresponds to a first downlink subcarrier space configuration in which the PDCCH is transmitted, and
   the $\mu_{PUSCH}$ corresponds to a second uplink subcarrier space configuration in which the first PUSCH and the second PUSCH are transmitted.

3. A base station apparatus comprising:
   reception circuitry configured to receive, in one uplink Bandwidth Part (BWP) of one serving cell, a first Physical Uplink Shared Channel (PUSCH) corresponding to a configured uplink grant; and
   transmission circuitry configured to transmit, in one downlink BWP of the one serving cell, downlink control information on a Physical Downlink Control Channel (PDCCH), that schedules a second PUSCH, wherein
   in the one uplink BWP, in a case that a duration of the first PUSCH overlaps a duration of the second PUSCH, an initial uplink symbol of the first PUSCH is expected to not be earlier than an initial uplink symbol at which a Cyclic Prefix (CP) begins after a predetermined period of time after a last symbol of the PDCCH.

4. The base station apparatus according to claim 3, wherein
   the predetermined period of time is provided at least based on a parameter $\mu'''$,
   the parameter $\mu'''$ corresponds to a smaller one of $\mu_{DL}$ and $\mu_{PUSCH}$,
   the $\mu_{DL}$ corresponds to a first downlink subcarrier space configuration in which the PDCCH is transmitted, and
   the $\mu_{PUSCH}$ corresponds to a second uplink subcarrier space configuration in which the first PUSCH and the second PUSCH are transmitted.

5. A communication method used by a terminal apparatus, the communication method comprising:
   transmitting, in one uplink Bandwidth Part (BWP) of one serving cell, a first Physical Uplink Shared Channel (PUSCH) corresponding to a configured uplink grant; and
   receiving, in one downlink BWP of the one serving cell, downlink control information on a Physical Downlink Control Channel (PDCCH), that schedules a second PUSCH, wherein
   in the one uplink BWP, in a case that a duration of the first PUSCH overlaps a duration of the second PUSCH, an initial uplink symbol of the first PUSCH is expected to not be earlier than an initial uplink symbol at which a Cyclic Prefix (CP) begins after a predetermined period of time after a last symbol of the PDCCH.

6. The communication method according to claim 5, wherein
   the predetermined period of time is provided at least based on a parameter $\mu'''$,
   the parameter $\mu'''$ corresponds to a smaller one of $\mu_{DL}$ and $\mu_{PUSCH}$,
   the $\mu_{DL}$ corresponds to a first downlink subcarrier space configuration in which the PDCCH is transmitted, and
   the $\mu_{PUSCH}$ corresponds to a second uplink subcarrier space configuration in which the first PUSCH and the second PUSCH are transmitted.

7. A communication method used by a base station apparatus, the communication method comprising:
   receiving, in one uplink Bandwidth Part (BWP) of one serving cell, a first Physical Uplink Shared Channel (PUSCH) corresponding to a configured uplink grant; and
   transmitting, in one downlink BWP of the one serving cell, downlink control information on a Physical Downlink Control Channel (PDCCH), that schedules a second PUSCH, wherein
   in the one uplink BWP, in a case that a duration of the first PUSCH overlaps a duration of the second PUSCH, an initial uplink symbol of the first PUSCH is expected to not be earlier than an initial uplink symbol at which a Cyclic Prefix (CP) begins after a predetermined period of time after a last symbol of the PDCCH.

8. The communication method according to claim 7, wherein the predetermined period of time is provided at least based on a parameter $\mu'''$, the parameter $\mu'''$ corresponds to a smaller one of $\mu_{DL}$ and $\mu_{PUSCH}$,
   the $\mu_{DL}$ corresponds to a first downlink subcarrier space configuration in which the PDCCH is transmitted, and
   the $\mu_{PUSCH}$ corresponds to a second uplink subcarrier space configuration in which the first PUSCH and the second PUSCH are transmitted.

* * * * *